(12) United States Patent
Berube et al.

(10) Patent No.: US 7,536,733 B2
(45) Date of Patent: May 26, 2009

(54) PLATFORM FOR TRAINING AND AIDING A PET TO USE A CONVENTIONAL TOILET

(76) Inventors: Denis Berube, 1954, Richardson #4, Montreal, Quebec (CA) H3K 1G7; Regent Dion, 5122, Monsabré, Montreal, Quebec (CA) H1M 2P8

( * ) Notice: Subject to any disclaimer, the term of this patent is extended or adjusted under 35 U.S.C. 154(b) by 667 days.

(21) Appl. No.: 11/186,123

(22) Filed: Jul. 20, 2005

(65) Prior Publication Data

US 2007/0017023 A1    Jan. 25, 2007

(51) Int. Cl.
*A01K 1/01* (2006.01)
(52) U.S. Cl. ................ 4/661; 119/162; 4/254
(58) Field of Classification Search .......... 4/231, 4/237, 240, 254, 340–342, 420, 661; 119/161, 119/162
See application file for complete search history.

(56) References Cited

U.S. PATENT DOCUMENTS

| | | | |
|---|---|---|---|
| 1,505,048 A * | 8/1924 | McLeod | 4/420 X |
| 3,537,112 A * | 11/1970 | Goodman | 4/231 |
| 5,181,734 A | 1/1993 | Brown | |
| 5,206,959 A * | 5/1993 | Provenzano | 4/231 |
| 6,022,038 A | 2/2000 | Maxwell et al. | |
| 6,196,587 B1 | 3/2001 | Sage | |
| 6,341,578 B1 * | 1/2002 | Berube | 119/162 |

* cited by examiner

*Primary Examiner*—Robert M Fetsuga

(57) ABSTRACT

A platform for training and aiding a pet to use a conventional toilet is attached to the rim of a toilet bowl and further provided with a holding means used for holding a tray containing a substance to attract and create a habit for the pet to come to that location. Instead of a tray, a specially designed unit containing cat litter or its equivalent can also be used for the same purpose. Over time, the holding means can be removed as the pet no longer needs to be <<baited>> to the location. In this manner, only the holding means and tray become useless, a far lesser investment.

2 Claims, 6 Drawing Sheets

Figure 1:
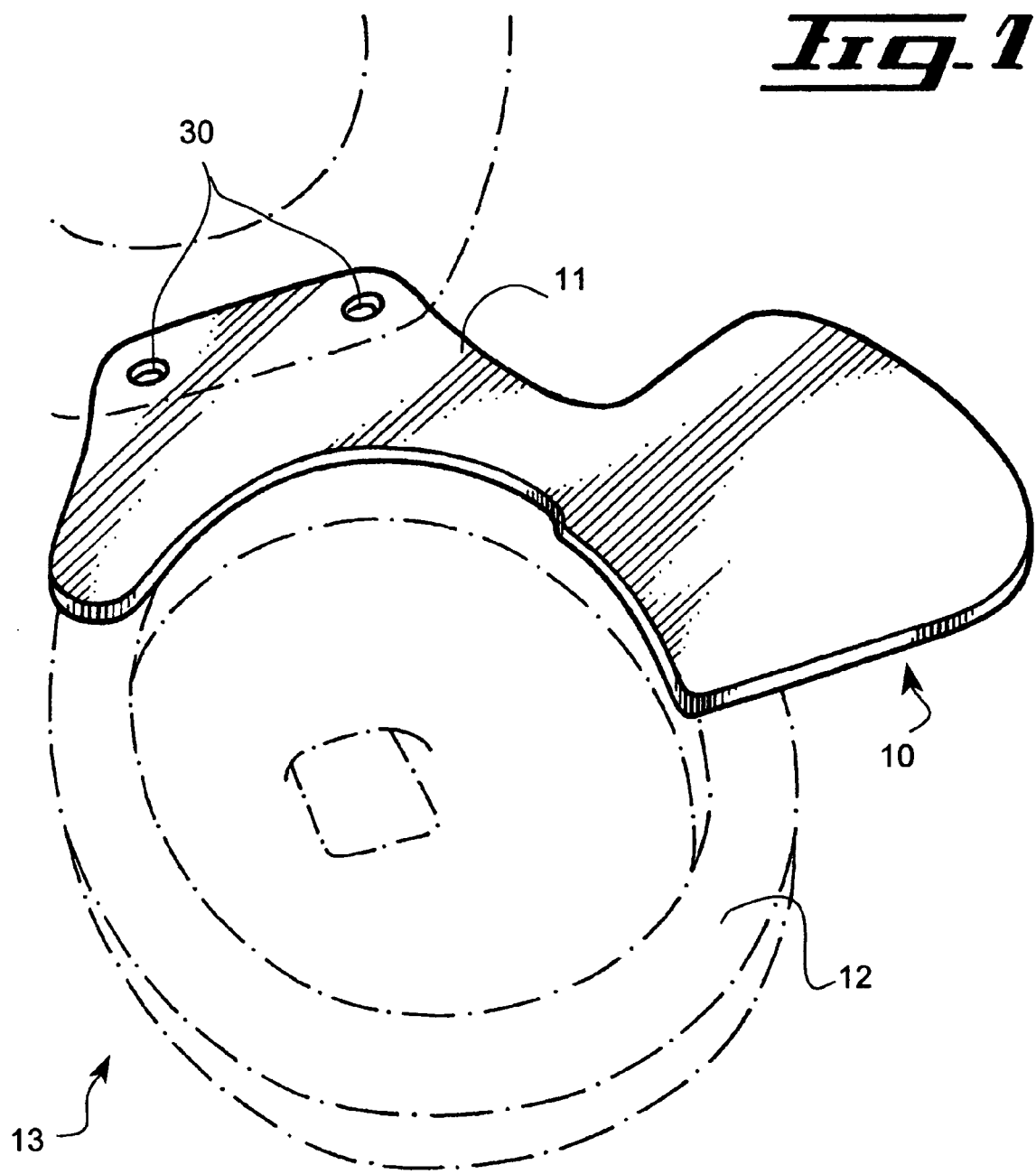

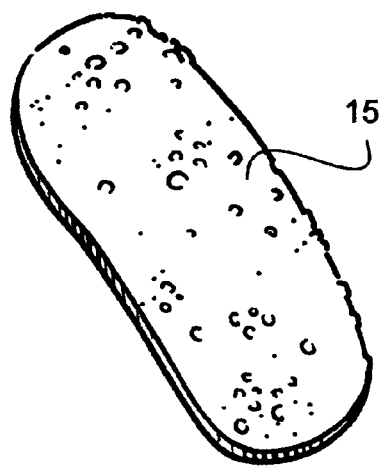
Fig_2
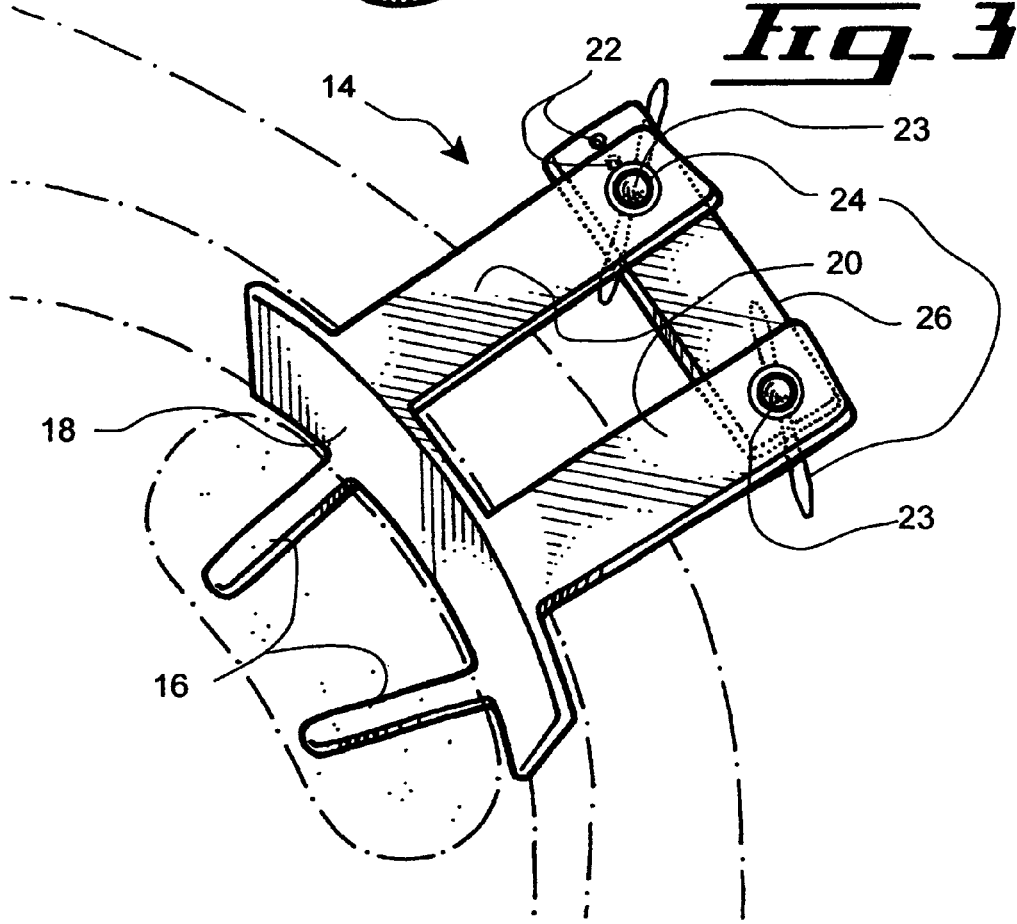
Fig_3

PLATFORM FOR TRAINING AND AIDING A PET TO USE A CONVENTIONAL TOILET

BACKGROUND OF THE INVENTION

1. Field of the Invention

The invention relates generally to toilet training equipment but more particularly to toilet training for pets.

2. Background of the Invention

To eliminate inconveniences related to pets relieving themselves outdoors, on lawns, and sidewalks, pets, more particularly cats, are often provided with indoor facilities such as a cat litter box but this solution is also unsatisfactory in some respects such as expense, odor and the required frequent clean up. Over the years, a tendency has developped toward the training of cats to use a standard toilet bowl. One of the co-inventor in this application is no stranger to that tendency, having himself received U.S. Pat. No. 6,341,578 for a device of that type. The device described in that patent had a main section fitted over the rim of a toilet bowl, a releasable section and a platform on which a pet sits. The whole installation proved to be quite cumbersome and was a hindrance to normal use of the toilet by humans. Over time, as the animal became used to the environment, components were gradually removed to leave only the platform. Which made the rest of the parts no longer useful but a substantial amount had already been spent for something having a very limited use.

Clearly, a more economical and practical way to toilet train a pet had to be found.

In view of the foregoing disadvantages inherent in the known devices now present in the prior art, the present invention, which will be described subsequently in greater detail, is to provide objects and advantages which are:

To provide a training technique and an associated training structure for training a household pet to use a conventional toilet bowl.

To provide a training device in accordance with the previous objects which would conform to conventional forms of manufacturing, be of simple construction and easy to use so as to provide a training device that will be economically feasible, long lasting and relatively trouble free in operation.

To attain these ends, the present invention generally comprises a platform attached to the rim of a toilet bowl and further provided with a holding means used for holding either a tray containing a substance that attracts and creates a habit for the pet to come to that location. Instead of a tray containing a substance, a specially designed self contained substance not requiring a tray can be used. Teh substance can be derived from cat litter as well as water soluble binding agents. Over time, the holding means can be removed as the pet no longer needs to be <<baited>> to the location. In this manner, only the holding means and tray (if applicable) become useless, a far lesser investment wasted.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE PREFERRED EMBODIMENT

FIG. 1 Perspective view of a platform that is boltable to the toilet bowl.

FIG. 2 Perspective view of a tray.

FIG. 3 Perspective view of the holding means.

Figure 4:
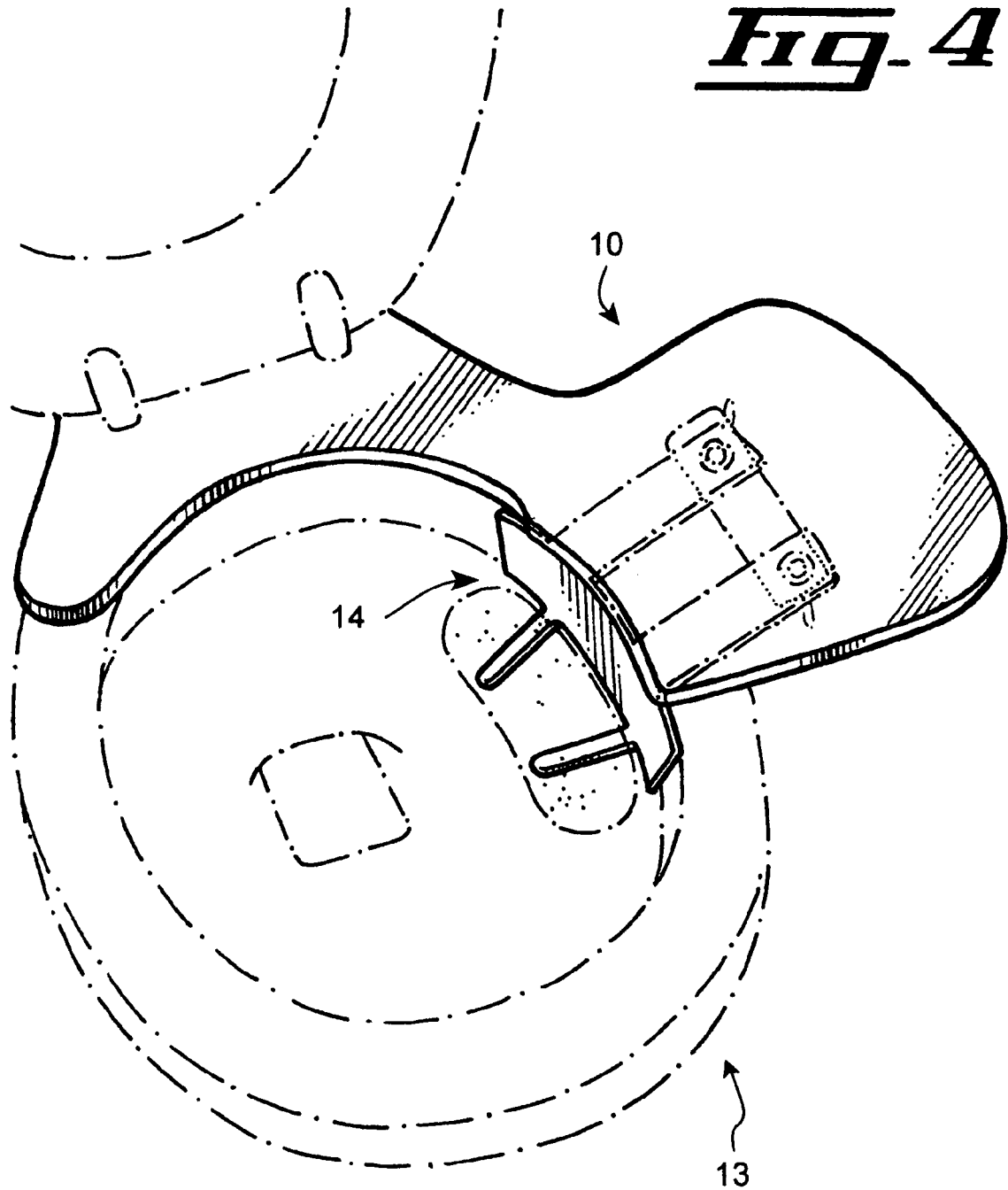

FIG. 4 Perspective view of the holding means with the platform.

Figure 5:
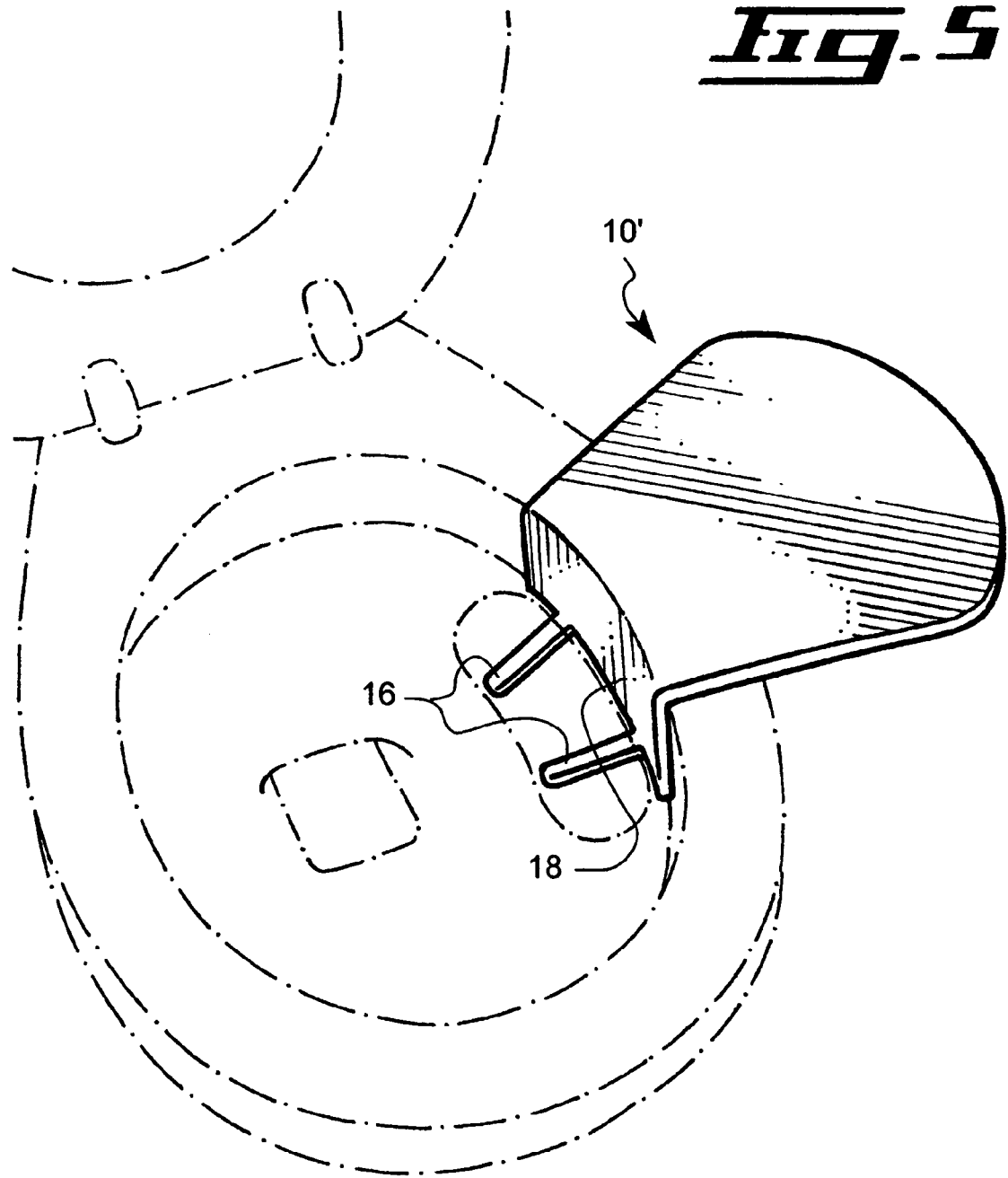

FIG. 5 Perspective view of an integrated holding means and platform.

Figure 6:
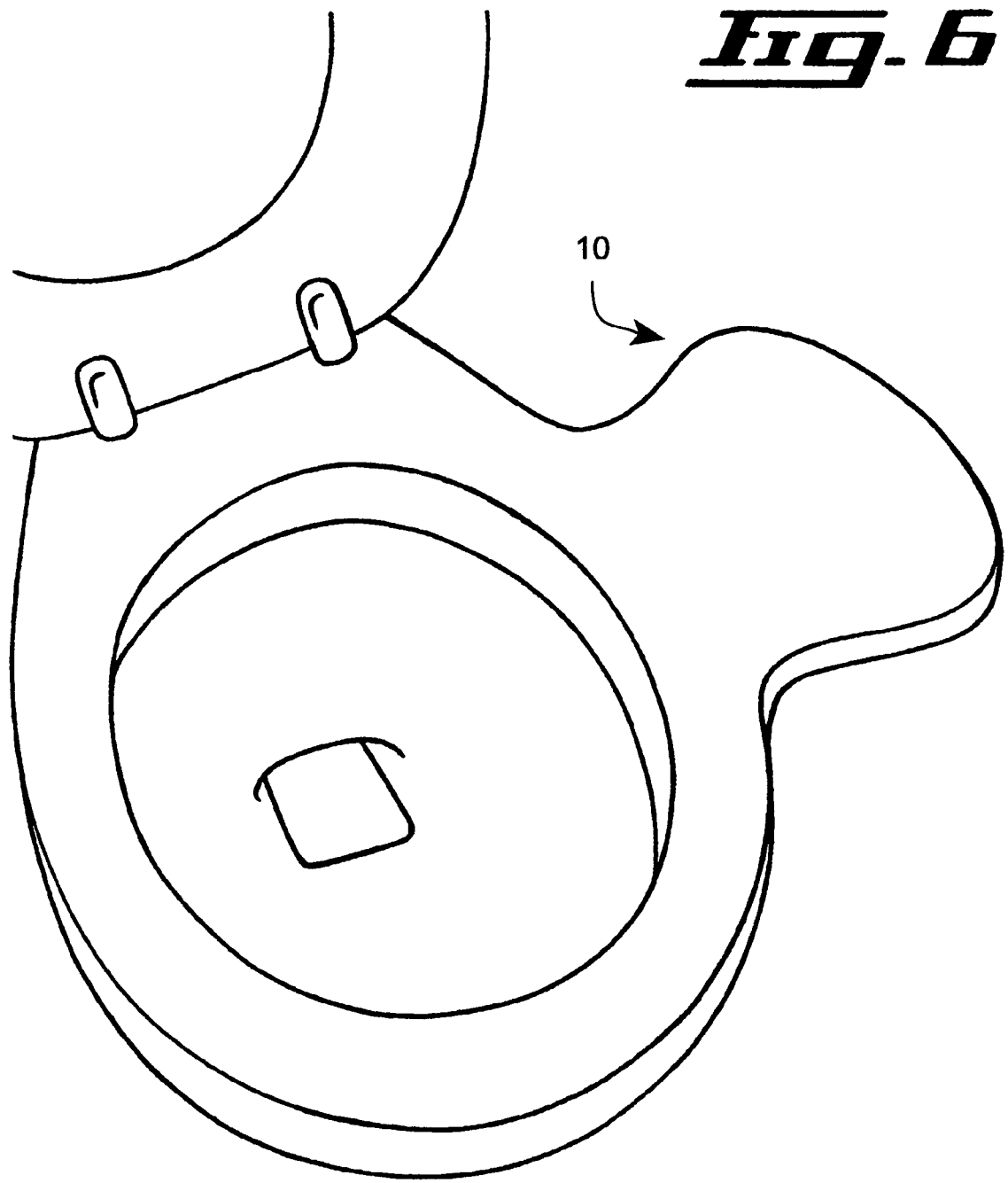

FIG. 6 Perspective view of a platform integrated with a proprietary toilet bowl.

Figure 7A:
Figure 7B:
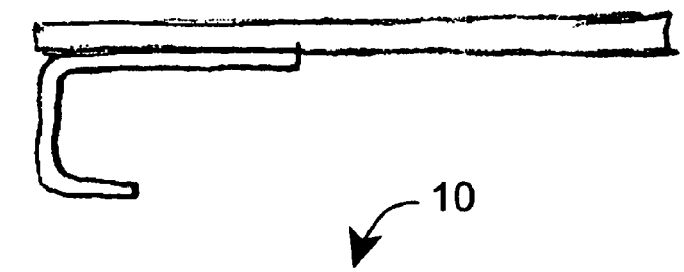

FIGS. 7*abcde* Side views of various releasable attachment means to secure the platform to the toilet bowl rim.

DETAILED DESCRIPTION OF THE EMBODIMENTS

A platform (10) for training and aiding pets to use a conventional toilet is attached to of a toilet bowl rim (12), part of a toilet (13) and further provided with a holding means (14) used for holding a substance (15) containing a component to attract and create a habit for the pet to come to that location, the substance dissolves in water. The substance can be cat litter contained in a tray or it can be, as illustrated, a self contained consistent clump.

Over time, the holding means (14) shown in FIG. 3 can be removed as the pet no longer needs to be <<baited>> to the location. In this manner, only the platform remains (12) and only the holding means (14) becomes no longer necessary instead of having to discard the whole releasable section as per this inventor's own patent 578 described hereinabove.

The embodiment shown in FIGS. 3-4 has a pair of horns (16) upon which is laid the substance (15). A rim conforming plate (18) follows an inside curvature of the toilet bowl rim

(12) by deformation created by moving stems (20) closer or farther away. This moving closer or farther away of the stems (20) is accomplished by changing a hole (22) into which a bolt (23) passes. The holes (22) are situated on a transverse bar (26) through which a second bolt (23) passes. Both bolts are secured in place by a nut (24), which can be in the form of a wingnut, although not necessarily so.

Once installed, putting the platform (10) on top of the holding means (14) secures it in place by pressure.

As per FIG. 1 the platform (10) has an extension (11) which has openings (30) to allow standard toilet seat bolts (not shown) to pass through and fixedly attach the platform (10) and its extension (11) to the toilet (13).

FIG. 5 shows a variant of the platform (10') wherein the horns (16) and the rim conforming plate (18) are integral with the platform (10'). In this variant, the horns (16) can be snapped off when no longer required. The platform (10') can be adhesively attached to the toilet (13) by way of a peel and stick means (not shown).

FIG. 6 showns a variant of the platform (10, 10') that is integral with the toilet (13), this variant, however, is anticipated by this applicant's prior patent and is disclosed here for disclosure purposes. It is for use only with well train pets since it cannot hold the substance (15).

Figure 7C:
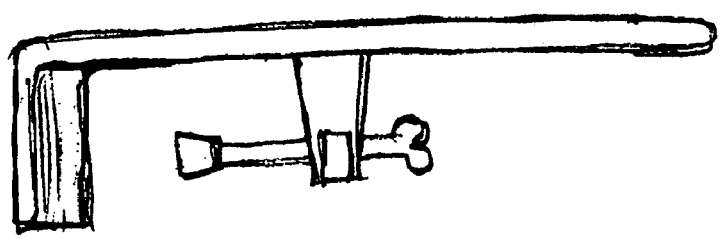
Figure 7D:
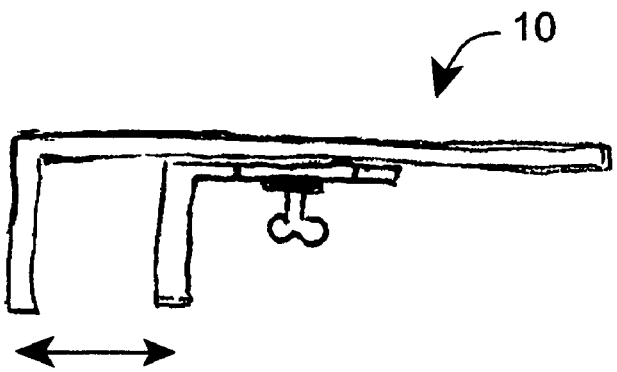
Figure 7E:
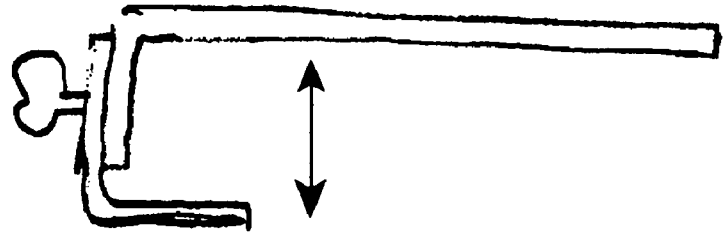

FIGS. 7abcde show various releasable attachment means to secure the platform (10') to the toilet bowl rim (12). These means of releasable attachment are known in the art for attaching a variety of objects onto a variety of locations and consist of resiliently deformable clamps as per FIGS. 7ab, a threadable clamping means as per FIG. 7c, and a vertical clamping means as per FIG. 7e wherein a plate (30) applies pressure to the underside of the toilet bowl rim (13). Both FIG. 7d and FIG. 7e feature a tightening bolt assembly that locks or frees a movable element procuring a tightening means. Theses means are self explanatory and will not be further discussed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A platform for training and aiding pets to use a conventional toilet comprising:

a platform attached to a toilet bowl rim of a toilet;

said platform further provided with a holding means used for holding a substance containing a component to attract and create a habit for said pets to come to said platform;

said holding means consisting of a pair of horns upon which is laid said substance;

a rim conforming plate follows an inside curvature of said toilet bowl rim by deformation created by moving stems closer or farther away by changing a hole into which a bolt passes;

said holes situated on a transverse bar through which a second bolt passes;

both said bolts being secured in place by a nut.

2. A platform for training and aiding pets to use a conventional toilet as in claim 1 wherein:

said platform being fixedly attached to said toilet bowl rim by way of an extension which has openings to allow standard toilet seat bolts to pass through and fixedly attach said platform and said extension to said conventional toilet.

* * * * *